United States Patent
Lin et al.

(10) Patent No.: US 11,574,447 B2
(45) Date of Patent: Feb. 7, 2023

(54) METHOD FOR CAPTURING REAL-WORLD INFORMATION INTO VIRTUAL ENVIRONMENT AND RELATED HEAD-MOUNTED DEVICE

(71) Applicant: HTC Corporation, Taoyuan (TW)

(72) Inventors: Sheng-Cherng Lin, Taoyuan (TW); Chien-Hsin Liu, Taoyuan (TW); Shih-Lung Lin, Taoyuan (TW)

(73) Assignee: HTC Corporation, Taoyuan (TW)

( * ) Notice: Subject to any disclaimer, the term of this patent is extended or adjusted under 35 U.S.C. 154(b) by 97 days.

(21) Appl. No.: 16/997,920

(22) Filed: Aug. 19, 2020

(65) Prior Publication Data

US 2022/0058876 A1  Feb. 24, 2022

(51) Int. Cl.
| | |
|---|---|
| *G06T 19/00* | (2011.01) |
| *G06T 17/20* | (2006.01) |
| *G06T 7/73* | (2017.01) |
| *G06F 3/01* | (2006.01) |
| *G06V 20/64* | (2022.01) |

(52) U.S. Cl.
CPC ............ *G06T 19/006* (2013.01); *G06F 3/011* (2013.01); *G06F 3/013* (2013.01); *G06T 7/73* (2017.01); *G06T 17/20* (2013.01); *G06V 20/64* (2022.01); *G06T 2210/56* (2013.01); *G06T 2215/16* (2013.01)

(58) Field of Classification Search
CPC ......... G06T 19/006; G06T 7/73; G06T 17/20; G06T 2210/56; G06T 2215/16; G06F 3/011; G06F 3/013; G06K 9/00201
See application file for complete search history.

(56) References Cited

U.S. PATENT DOCUMENTS

| | | | |
|---|---|---|---|
| 2012/0206452 A1* | 8/2012 | Geisner | G06V 10/26 |
| | | | 345/419 |
| 2019/0097896 A1* | 3/2019 | Kritzler | G06F 3/014 |
| 2020/0035020 A1* | 1/2020 | Price | G06T 7/11 |
| 2020/0201445 A1 | 6/2020 | Horowitz | |
| 2020/0298112 A1* | 9/2020 | Fish | G06T 19/003 |

FOREIGN PATENT DOCUMENTS

| | | | |
|---|---|---|---|
| CN | 102945564 A | 2/2013 | |
| TW | I642903 B | 12/2018 | |
| TW | 201928761 A | 7/2019 | |
| TW | 202024869 A | 7/2020 | |
| WO | WO-2019079358 A1 * | 4/2019 | B25J 9/1697 |

* cited by examiner

*Primary Examiner* — Alexander Eisen
*Assistant Examiner* — Nathaniel P Brittingham
(74) *Attorney, Agent, or Firm* — CKC & Partners Co., LLC (57) ABSTRACT

A method for capturing real-world information into a virtual environment is provided. The method is suitable for a head-mounted device (HMD) located in a physical environment, and includes the following operations: providing the virtual environment, wherein a real-world content within the virtual environment is captured from a part of the physical environment corresponding to a perspective of the HMD; tracking a feature point which located within the physical environment and moved by a user, so as to define a selected plane of the real-world content by projecting a moving track of the feature point onto the real-world content; capturing image information corresponding to the selected plane; and generating a virtual object having an appearance rendered according to the image information, in which the virtual object is adjustable in size.

16 Claims, 12 Drawing Sheets

METHOD FOR CAPTURING REAL-WORLD INFORMATION INTO VIRTUAL ENVIRONMENT AND RELATED HEAD-MOUNTED DEVICE

BACKGROUND

Technical Field

The present disclosure generally relates to a driving method for a head-mounted device. More particularly, the present disclosure relates to a method for capturing real-world information into a virtual environment.

Description of Related Art

In the field of industrial design, the design processes commonly used include sketching, scaled-down or -up real-world model making, and prototyping and testing. Since the sketch and the real-world model usually do not have a size equal to the final product, many design defects cannot be found until the prototype is finished.

The virtual reality (VR) technologies allow the designer to download scalable three-dimensional (3D) models from the pre-established database. However, it is the most instinct to modify or to improve the design by using real-world tools and materials, and a 3D model qualified for evaluation is often established not until the mid-late stages of the design processes because of the large amount of time needed for manually establishing a 3D model. Therefore, even with the conventional VR technologies, design defects still cannot be found in the very early stages of the design processes.

SUMMARY

The disclosure provides a method for capturing real-world information into a virtual environment. The method is suitable for a head-mounted device (HMD) located in a physical environment, and includes the following operations: providing the virtual environment, wherein a real-world content within the virtual environment is captured from a part of the physical environment corresponding to a perspective of the HMD; tracking a feature point which located within the physical environment and moved by a user, so as to define a selected plane of the real-world content by projecting a moving track of the feature point onto the real-world content; capturing image information corresponding to the selected plane; and generating a virtual object having an appearance rendered according to the image information, in which the virtual object is adjustable in size.

The disclosure provides a HMD located in a physical environment, which includes a display device, an optical camera, and a control circuit. The control circuit is adapted to: provide a virtual environment through the display device, wherein a real-world content within the virtual environment is captured from a part of the physical environment corresponding to a perspective of the HMD; track, through the optical camera, a feature point which located within the physical environment and moved by a user, so as to define a selected plane of the real-world content by projecting a moving track of the feature point onto the real-world content; capture, through the optical camera, image information corresponding to the selected plane; and generate a virtual object having an appearance rendered according to the image information, in which the virtual object is adjustable in size.

It is to be understood that both the foregoing general description and the following detailed description are by examples, and are intended to provide further explanation of the disclosure as claimed.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 1:
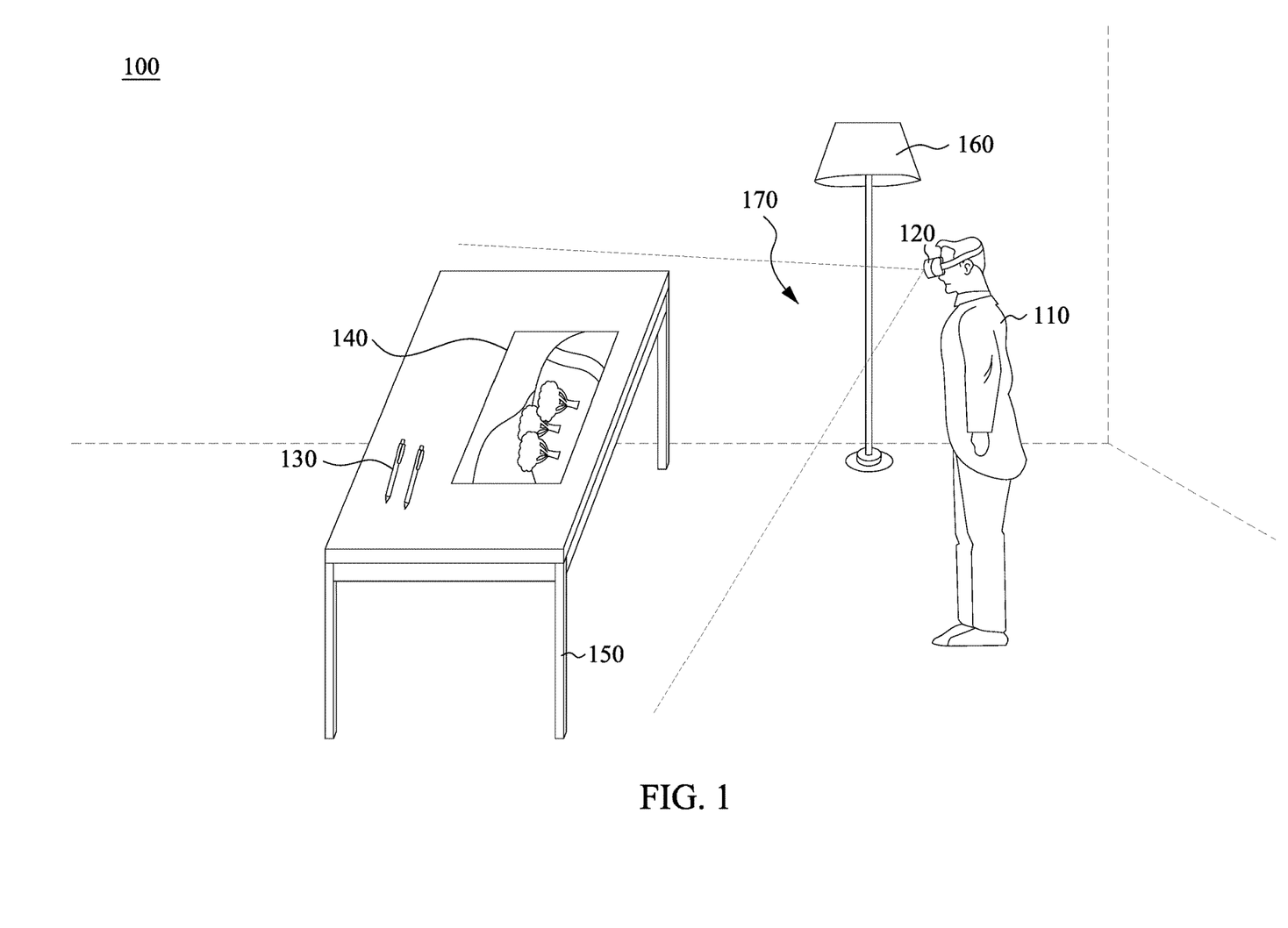
FIG. 1 shows an illustrative physical environment in which a user of a head-mounted device (HMD) is located.

FIG. 1 shows an illustrative physical environment 100 (real-world environment) in which a user 110 of a head-mounted device (HMD) 120 is located. The physical environment 100 comprises one or more real-world objects, for example, watercolor brushes 130, a sketch 140 of a mural, a desk 150 for placing the watercolor brushes 130 and the sketch 140, and a lamp 160. The user 110 can employee the HMD 120 to experience the virtual reality (VR), the augmented reality (AR), and/or the mixed reality (MR) that are rendered in visual and may include audio and/or tactile feedback in some embodiments.

Figure 2:
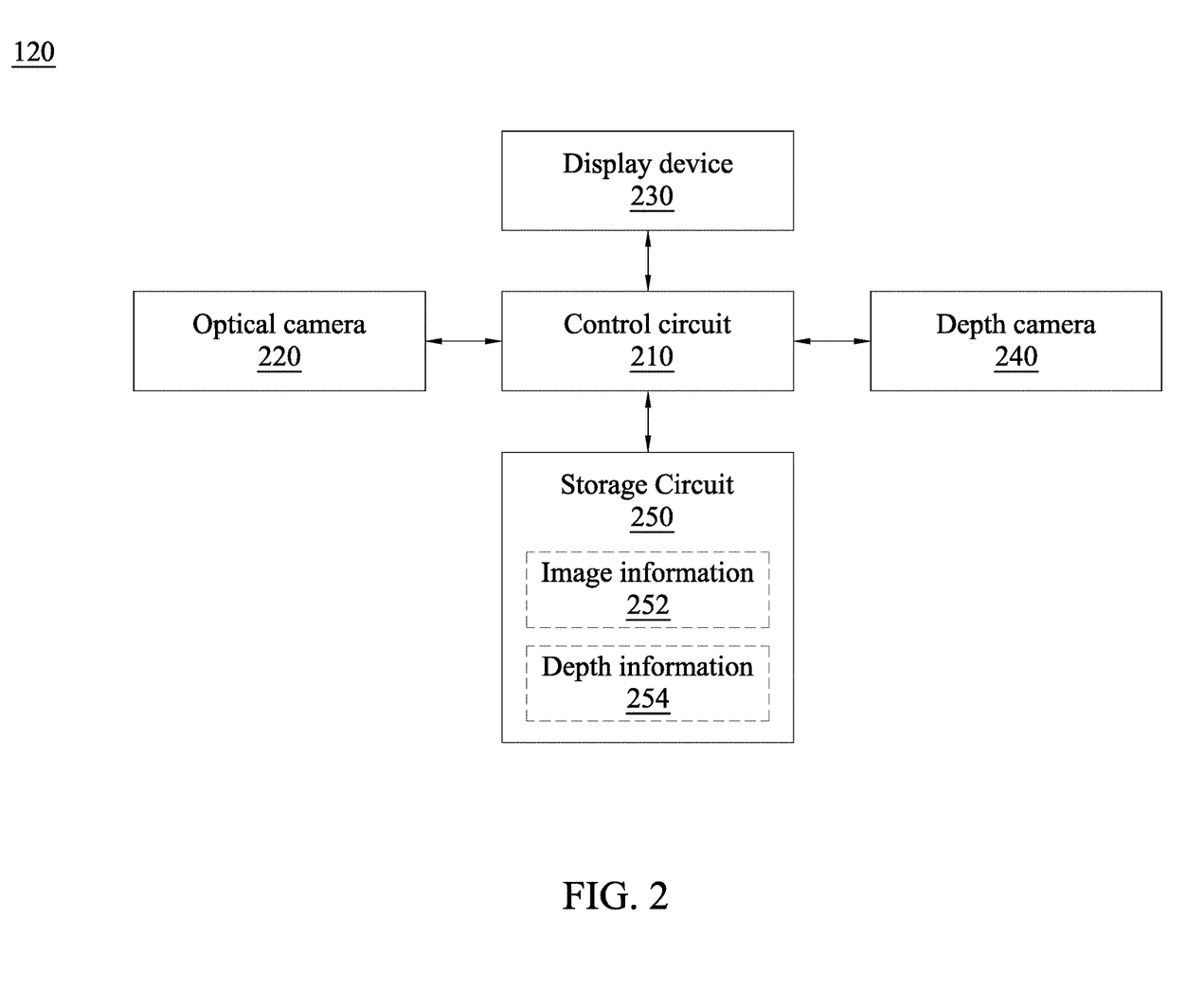
FIG. 2 is a simplified functional block diagram of the HMD according to one embodiment of the present disclosure.

FIG. 2 is a simplified functional block diagram of the HMD 120 according to one embodiment of the present disclosure. The HMD 120 comprises a control circuit 210, an optical camera 220, a display device 230, a depth camera 240, and a storage circuit 250, in which the control circuit 210 is coupled with these functional blocks. For the sake of brevity, other functional blocks of the HMD 120 are not shown in FIG. 2. Referring to FIG. 1 and FIG. 2, the optical camera 220 is a see-through camera that can capture a part of the physical environment 100 corresponding to the perspective 170 of the optical camera 220 (or the HMD), allowing the HMD 120 to render a visual environment (e.g., the AR or MR environment) including both virtual objects and real-world objects through the display device 230. The storage circuit 250 is configured to store image information 252 and depth information 254 obtained from the optical camera 220 and the depth camera 240, respectively. The image information 252 and the depth information 254 may be used to generate a virtual object, which will be further described in the following paragraphs.

In practice, the control circuit 210 may be realized by one or more general purpose single- or multi-chip processors, digital signal control circuits (DSPs), application specific integrated circuits (ASICs), field programmable gate arrays (FPGAs), other programmable logic devices, or combinations thereof. The storage circuit 250 may be realized by suitable volatile memory, nonvolatile memory, or the combinations thereof.

In some embodiments, the depth camera 240 may be realized by a stereo triangulation camera, a structured light camera, or a time-of-flight (TOF) camera.

Figure 3:
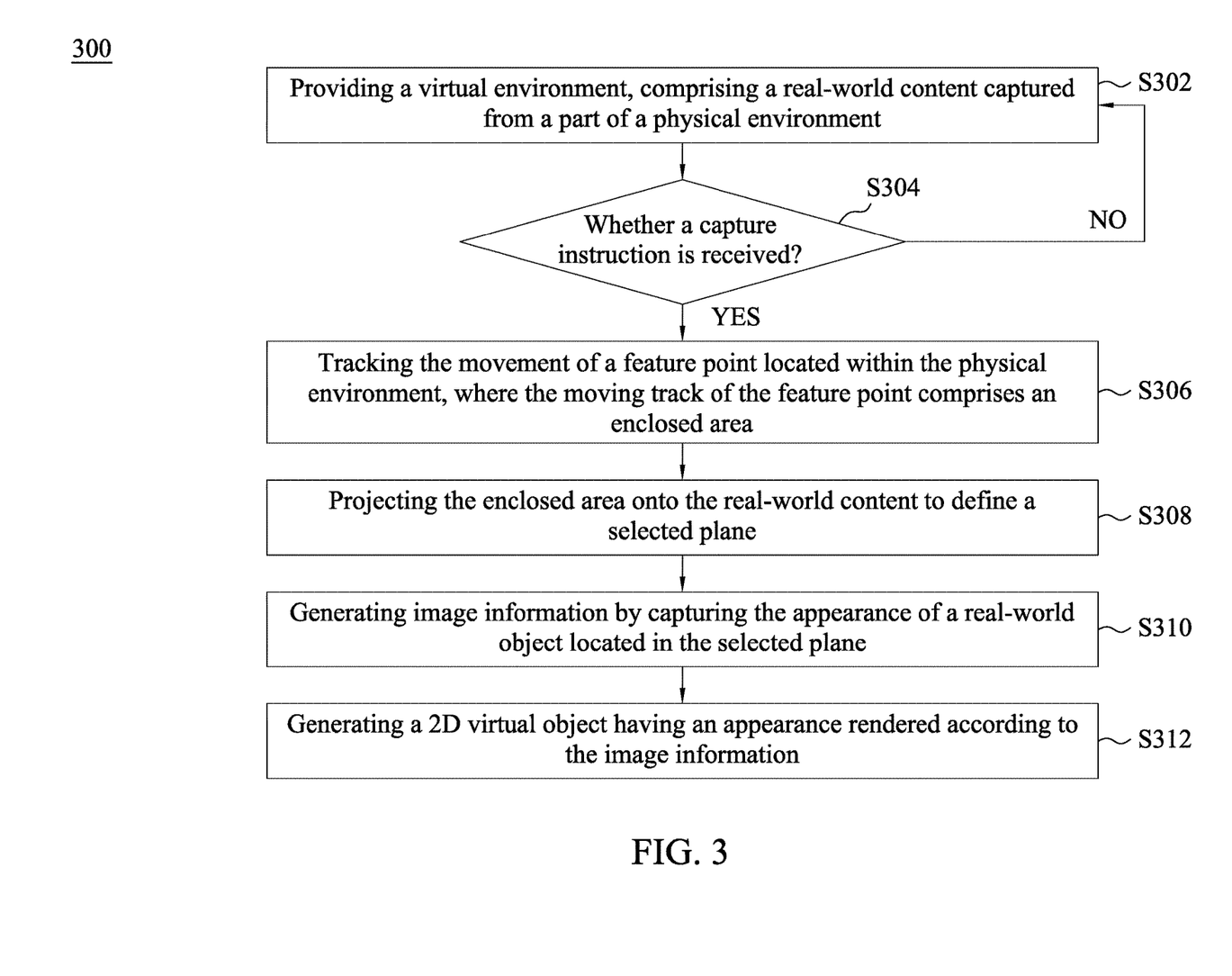
FIG. 3 is a flowchart of a method for capturing real-world information into a virtual environment according to one embodiment of the present disclosure.
Figure 4A:
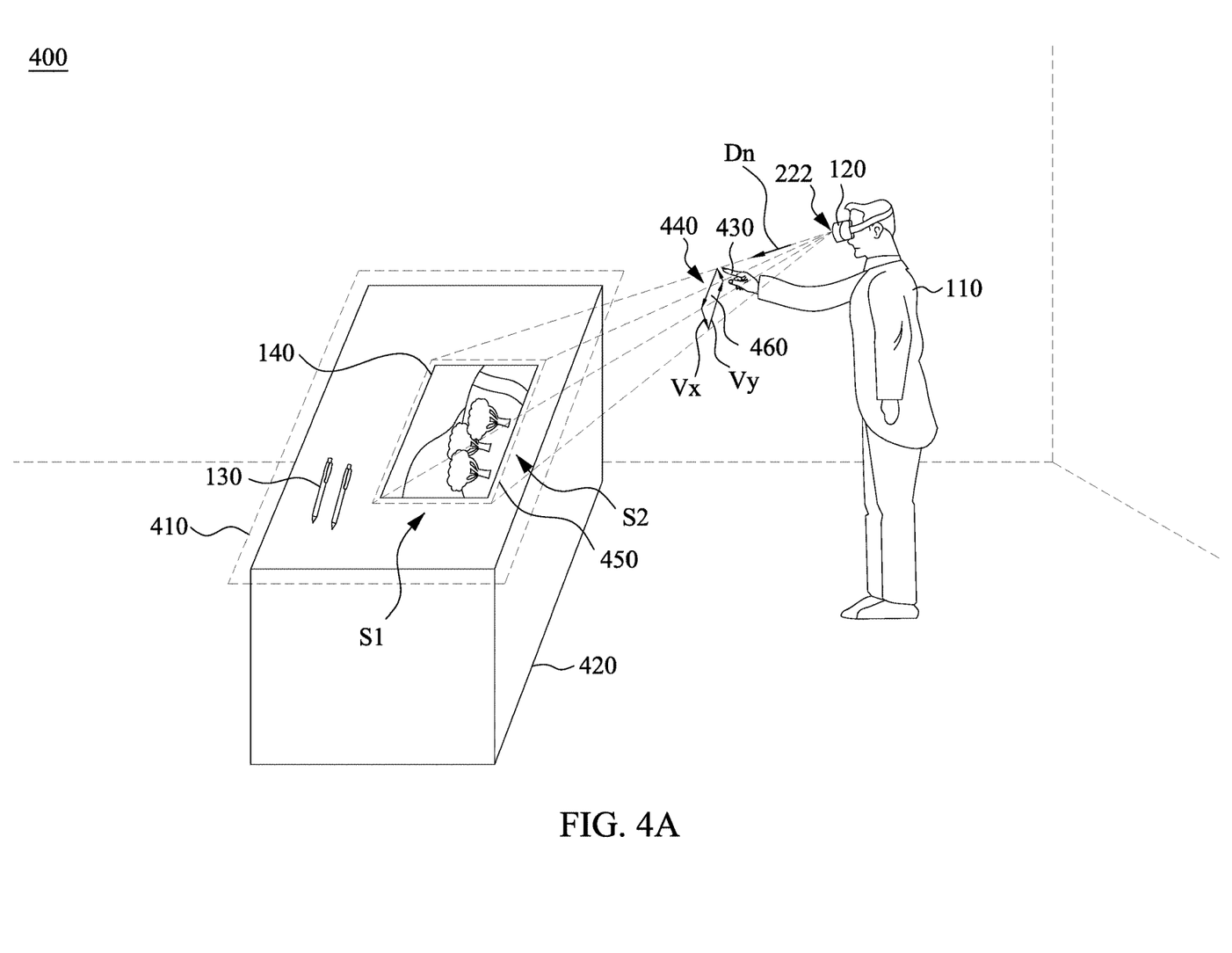
FIG. 4A shows an illustrative scenario that the user captures the real-world information into the virtual environment.

FIG. 3 is a flowchart of a method 300 for capturing real-world information into a virtual environment 400 according to one embodiment of the present disclosure. The HMD 120 is suitable for performing the method 300, for example, by using the control circuit 210 to execute programs stored in the storage circuit 250. In operation S302, the control circuit 210 provides a virtual environment 400 as shown in FIG. 4A through the display device 230. The virtual environment 400 comprises a real-world content 410 captured by the optical camera 220 from a part of the physical environment 100 corresponding to the perspective 170 of the HMD. For example, the real-world content 410 may comprise the watercolor brushes 130 and the sketch 140. Some of the real-world objects may be rendered as virtual objects having similar volume or size, while other real-world objects may be vanished in the virtual environment 400. For example, the desk 150 is rendered as a cube 420, while the lamp 160 is vanished.

In operation S304, the control circuit 210 determines whether a capture instruction is received. The capture instruction may be a predetermined user gesture which can be captured by the optical camera 220, or may be an input of a button of a handheld controller (not shown) communicatively coupled with the HMD 120. The control circuit 210 may conduct operation S306 if the capture instruction is received by the HMD 120, otherwise the control circuit 210 may conduct operation S302 again.

In operation S306, the control circuit 210 tracks the movement of a feature point 430 located within the physical environment 100 through the optical camera 220. In this embodiment, the feature point 430 is a finger of the user 110, but this disclosure is not limited thereto. In some embodiments, the feature point may be an end of the handheld controller (not shown) communicatively coupled with the HMD 120. The control circuit 210 may capture a moving track 440 of the feature point 430 which can be used in operation S308 to identify a selected plane 450 at least partially overlapping with the real-world content 410.

In operation S308, specifically, the moving track 440 is projected onto the real-world content 410 according to a straight direction Dn from a focal point 222 of the optical camera 220 to the feature point 430, so as to define an edge of the selected plane 450. In this embodiment, the moving track 440 forms an enclosed area 460, and thus the selected plane 450 can also be deemed as being defined by projecting the enclosed area 460 onto the real-world content 410 according to the straight direction Dn.

In other words, the selected plane 450 is defined by projecting the moving track 440 or the enclosed area 460 onto the real-world content 410 through a central projection (perspective projection) method in which the focal point 222 of the optical camera 220 is the center of projection. In some embodiments, the selected plane 450 and the enclosed area 460 may have shapes corresponding to each other, for example, rectangles, circulars, or any regular or irregular shapes.

In some embodiments, the moving track 440 may comprise only an x-axis vector Vx and a y-axis vector Vy having different directions. A head of the x-axis vector Vx is connected with an end of the y-axis vector Vy in some implementations. In these cases, the selected plane 450 may be rectangular, and the x-axis vector Vx and the y-axis vector Vy are projected onto the real-world content 410 according to the straight direction Dn (or by the central projection method) to respectively form two corresponding sides connected with each other of the selected plane 450, for example, the first side S1 and the second side S2. The control circuit 210 may automatically define another side of the selected plane 450 at an end, away from the first side S1, of the second side S2. The yet another side of the selected plane 450 may also be automatically defined at an end, away from the second side S2, of the first side S1.

Accordingly, at least a part of the edge of the selected plane 450 is defined by projecting the moving track 440 onto the real-world content 410 according to the straight direction Dn or by the central projection method.

When operation S308 is finished, the control circuit 210 conducts operation S310 to generate the image information 252 by capturing at least a part of the appearance of the real-world object(s) located in the selected plane 450. For example, the shape, pattern, and/or color in respect of the sketch 140 are captured as the image information 252. In this embodiment, the image information 252 comprises JPEG image data, but this disclosure is not limited thereto. In some embodiments, the image information 252 may comprise image data of any suitable image standards, such as the TIFF image data or the PNG image data.

Figure 4B:
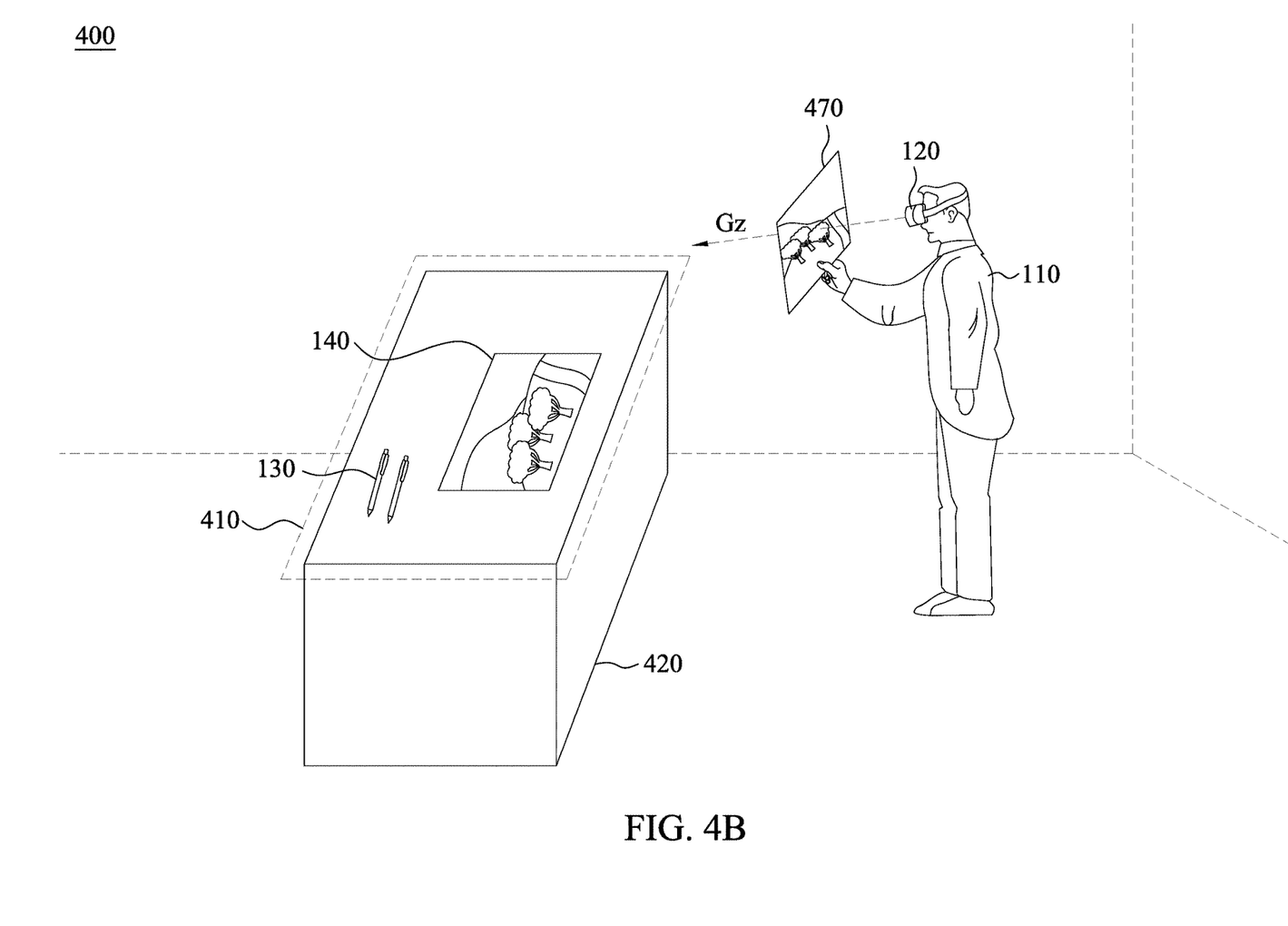
FIG. 4B shows an illustrative scenario that a 2D virtual object is generated according to the real-world information.
Figure 4C:
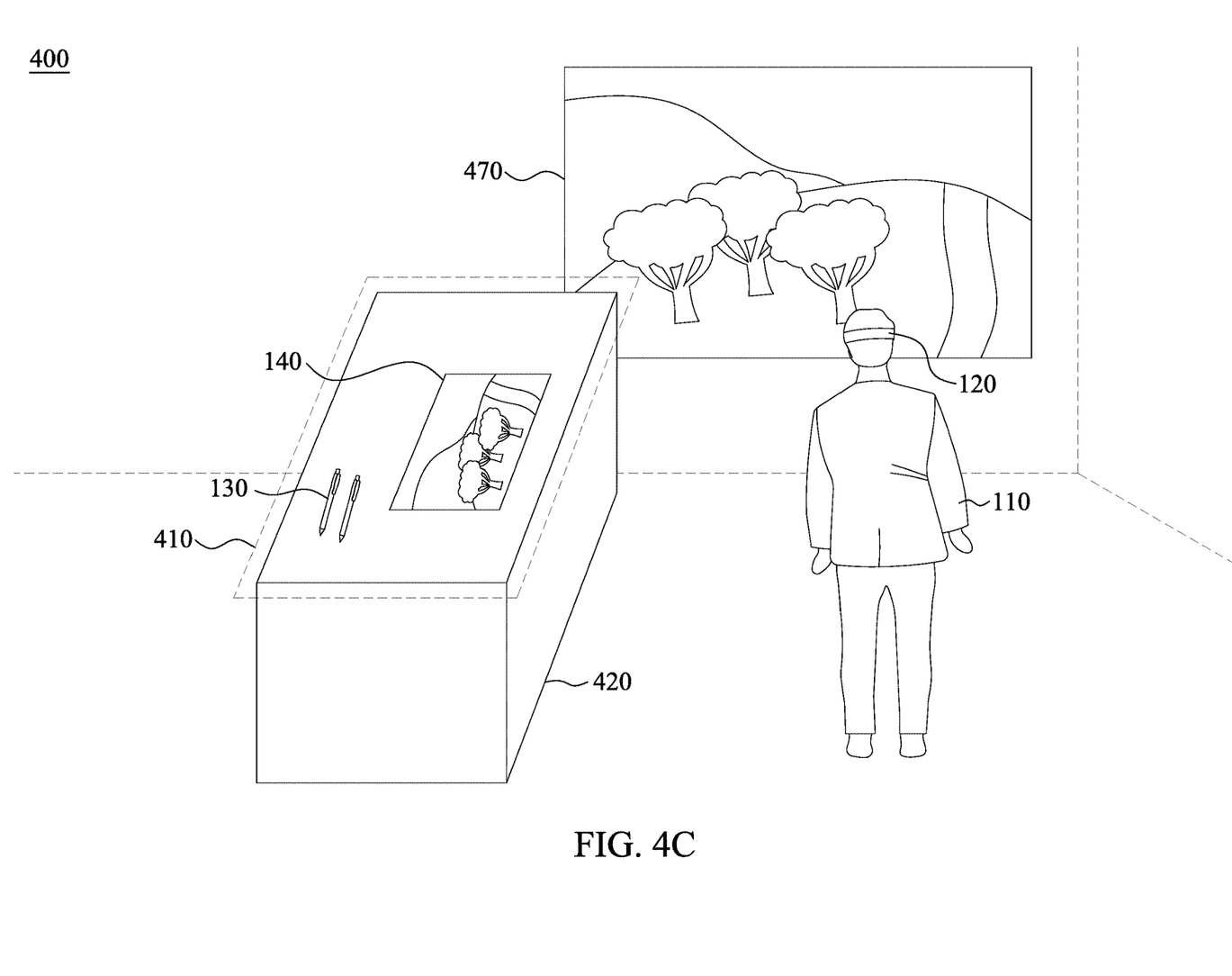
FIG. 4C shows an illustrative scenario that the user enlarges the size of the 2D virtual object.

As shown in FIG. 4B, the control circuit 210 generates a two-dimensional (2D) virtual mural 470 (i.e., virtual object) in operation S312 having an appearance rendered according to the image information 252. The control circuit 210 may provide, through the display device 230, the virtual mural 470 in front of the user 110 and on a straightly-gaze direction Gz of the user 110. Moreover, the control circuit 210 may adjust a surface of the virtual mural 470 to be perpendicular to the straightly-gaze direction Gz of the user 110. The virtual object generated in operation S312 is adjustable in size (width and length) or surface area, and is rotatable and position-variable in some embodiments. As shown in FIG. 4C, for example, the user 110 may enlarge the virtual mural 470 to have a size equal to the final creation, and place the virtual mural 470 near or onto a wall of the virtual environment 400, so as to evaluate under the true size whether there are any room for improvements, or whether any design defects exist.

Figure 5:
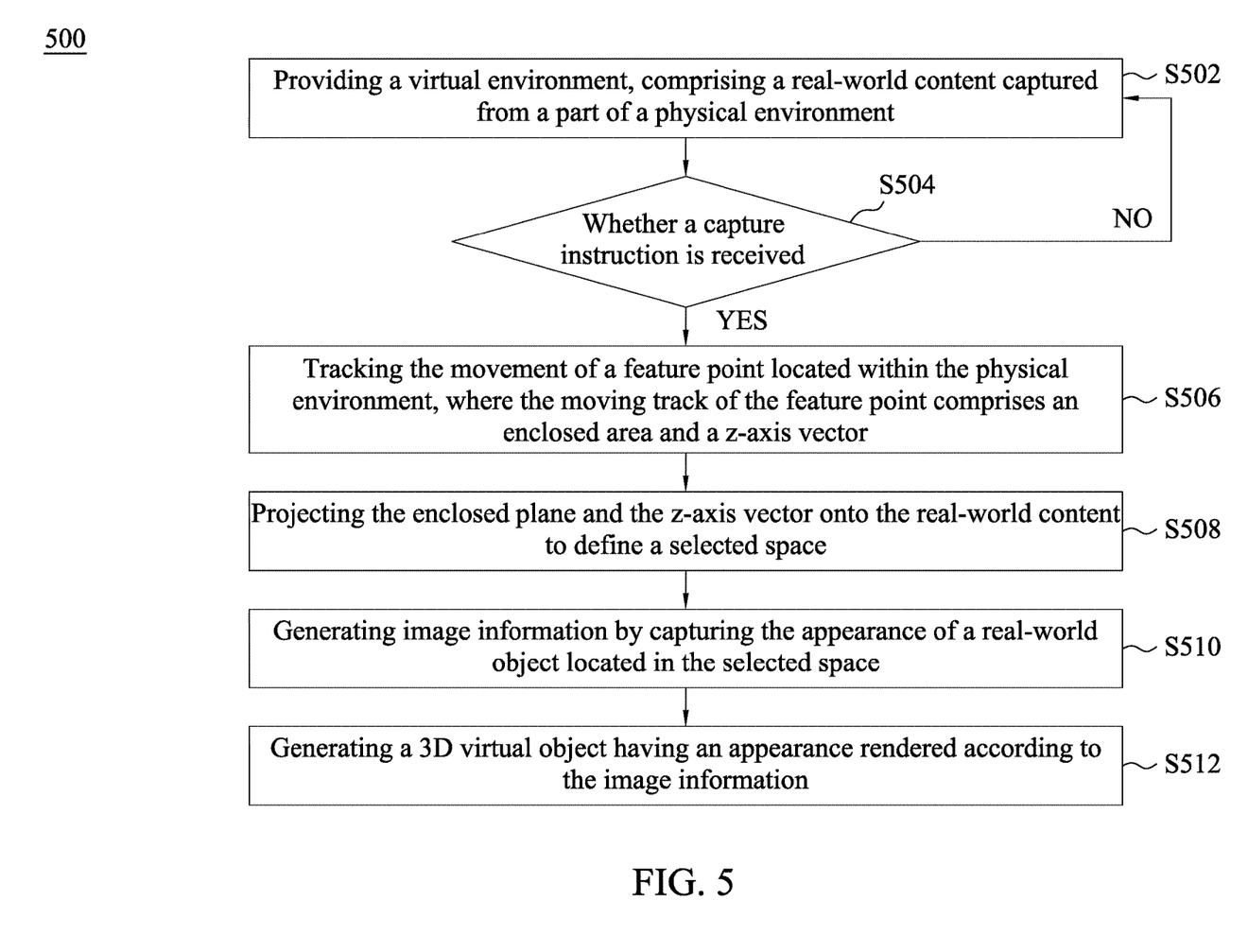
FIG. 5 is a flowchart of another method for capturing the real-world information into the virtual environment according to one embodiment of the present disclosure.

FIG. 5 is a flowchart of a method 500 for capturing real-world information into a virtual environment 600 according to one embodiment of the present disclosure. The method 500 comprises operations S502-S512. Operations S506, S508, and S510 are configured to capture at least part of the appearance of a three-dimensional (3D) real-world object located in the selected plane 450, while other operations of the method 500 are respectively similar to the corresponding operations of the method 300 of FIG. 3. For the sake of brevity, descriptions in respect of those operations will be given in short or be omitted here.

Figure 6A:
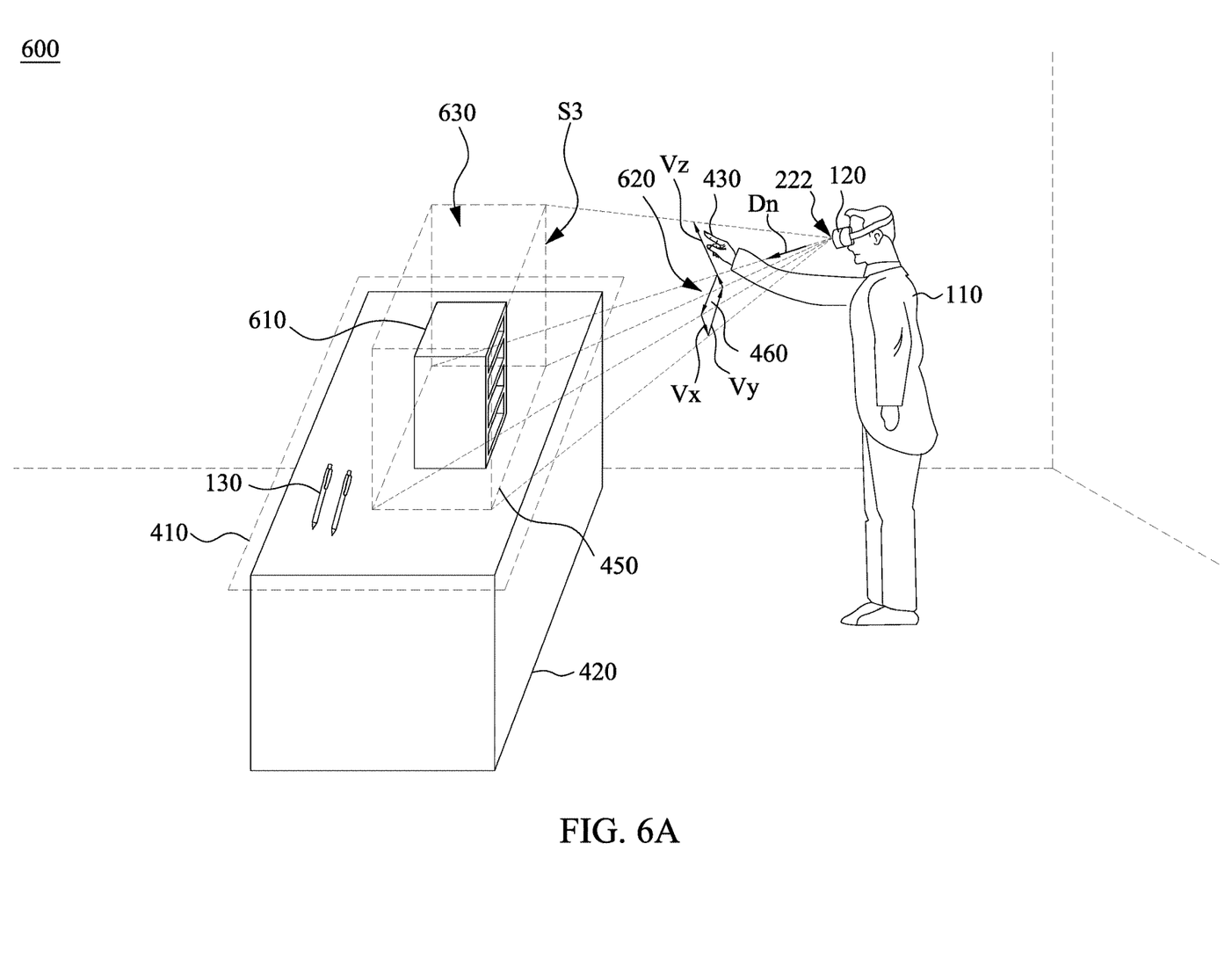
FIG. 6A shows an illustrative scenario that the user captures the real-world information into the virtual environment.

Referring to FIG. 5 and FIG. 6A, a 3D real-world object, the scale-down bookshelf model 610, is placed on the desk 150 in the physical environment 100, and thus the bookshelf model 610 is rendered as being placed on the cube 420 in the virtual environment 600. In other words, the real-world content 410 comprises the watercolor brushes 130 and the bookshelf model 610 in this embodiment.

In operation S506, the control circuit 210 tracks the movement of the feature point 430 located within the physical environment 100 through the optical camera 220, so as to capture a moving track 620 of the feature point 430. In this embodiment, the moving track 620 comprises (forms) not only the enclosed area 460 having any suitable shape, but also comprises a z-axis vector Vz.

In operation S508, the enclosed area 460 is projected onto the real-world content 410 to form the selected plane 450 according to the straight direction Dn from the focal point 222 of the optical camera 220 to the feature point 430. In some embodiments, the selected plane 450 may have a shape corresponding to the enclosed area 460, for example, a rectangle, a circular, or any regular or irregular shape. On the other hand, the z-axis vector Vz is also projected onto the real-world content 410 according to the straight direction Dn so as to define a third side S3 substantially perpendicular to the selected plane 450. As a result, a selected space 630 accommodating the bookshelf model 610 is defined by the selected plane 450 and the third side S3, in which the selected plane 450 and the third side S3 are the button surface and the height, respectively, of the selected space 630.

In other words, the enclosed area 460 and the z-axis vector Vz are projected onto the real-world content 410 through the central projection method to define the selected space 630, in which the focal point 222 of the optical camera 220 is the projection center. Accordingly, after the user 110 defines the selected plane 450 by drawing the enclosed area 460, the user 110 may further draws the z-axis vector according to the height of the real-world object to be captured, so as to create the selected space 630 having a suitable shape such as a rectangular parallelepiped or a cylinder.

In some embodiments, the moving track 620 may comprises only the x-axis vector Vx, the y-axis vector Vy, and the z-axis vector Vz having different directions. An end of the z-axis vector Vz may be connected with the head of the y-axis vector Vy, and end of the y-axis vector Vy may be connected with the head of the x-axis vector Vx in some implementations. The control circuit 210 may automatically define the selected plane 450 according to the x-axis vector Vx and the y-axis vector Vy as aforementioned, which will not be repeated here for the sake of brevity. Then, the z-axis vector Vz is projected onto the real-world content 410 to define the third side S3 so as to define the selected space 630.

In operation S510, the control circuit 210 obtains the size (e.g., the width and height) and the location of the bookshelf model 610 (i.e., the 3D real-word object) located in the selected space 630 through the depth camera 240. Then, the control circuit 210 captures the appearance of the bookshelf model 610 through the optical camera 220 as the image information 252. Notably, the method 500 needs not to capture the whole appearance of the bookshelf model 610, since capturing only a part of the appearance of the bookshelf model 610 corresponding to the perspective of the HMD 120 may be sufficient to evaluate the design in the very early stage of the design processes. The other un-captured parts of the appearance of the bookshelf model 610 may be set to predefined shapes, colors, and/or textures in the image information.

In some embodiments, the user 110 needs not to draw the Z-axis vector Vz. In operation S510, the control circuit 210 may automatically obtain the location and size of the bookshelf model 610 located in the selected space 630 by performing any suitable image recognition algorithms with the optical camera 220, or by performing any suitable depth estimation algorithms with the depth camera 240.

Figure 6B:
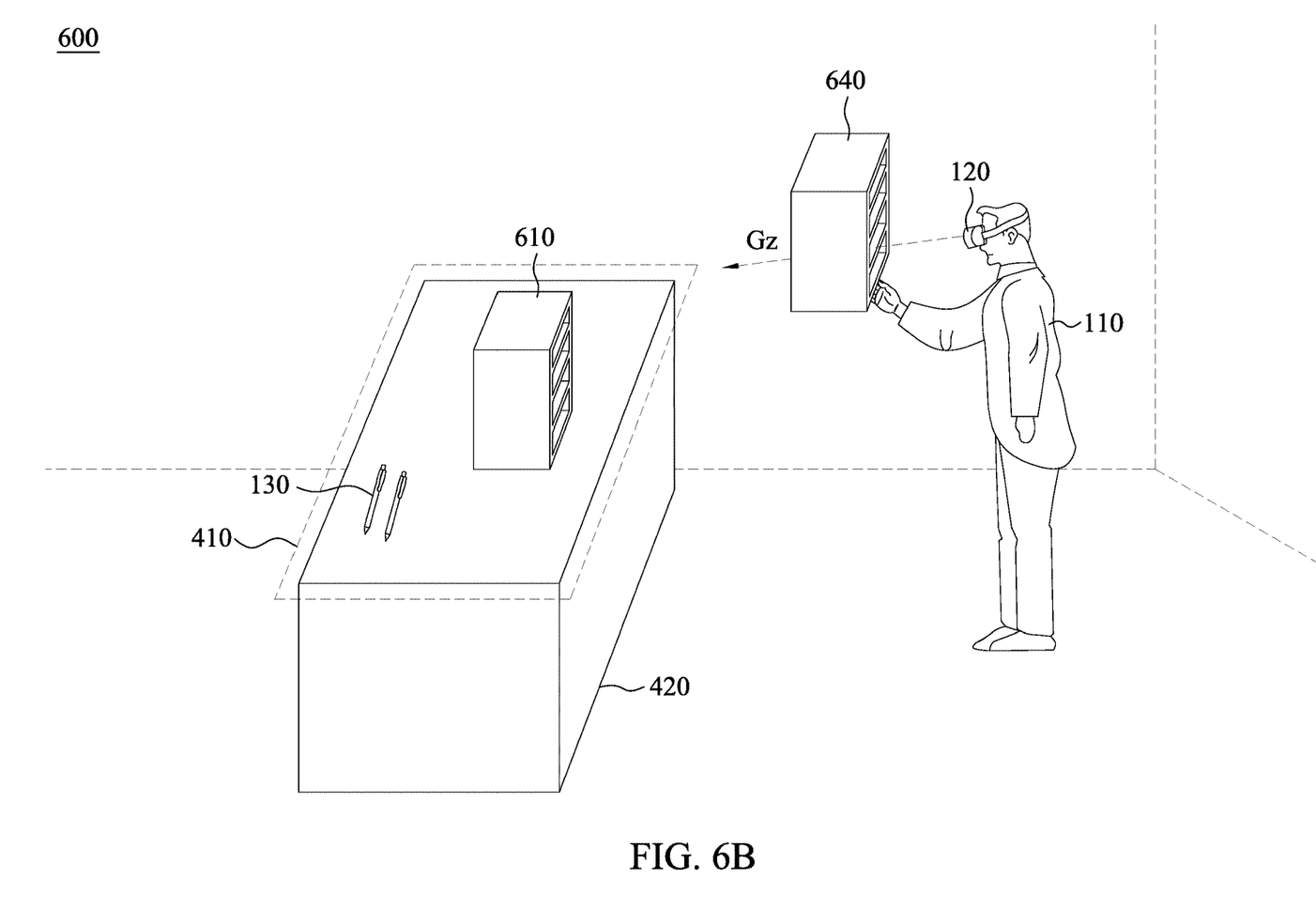
FIG. 6B shows an illustrative scenario that a 3D virtual object is generated according to the real-world information.
Figure 6C:
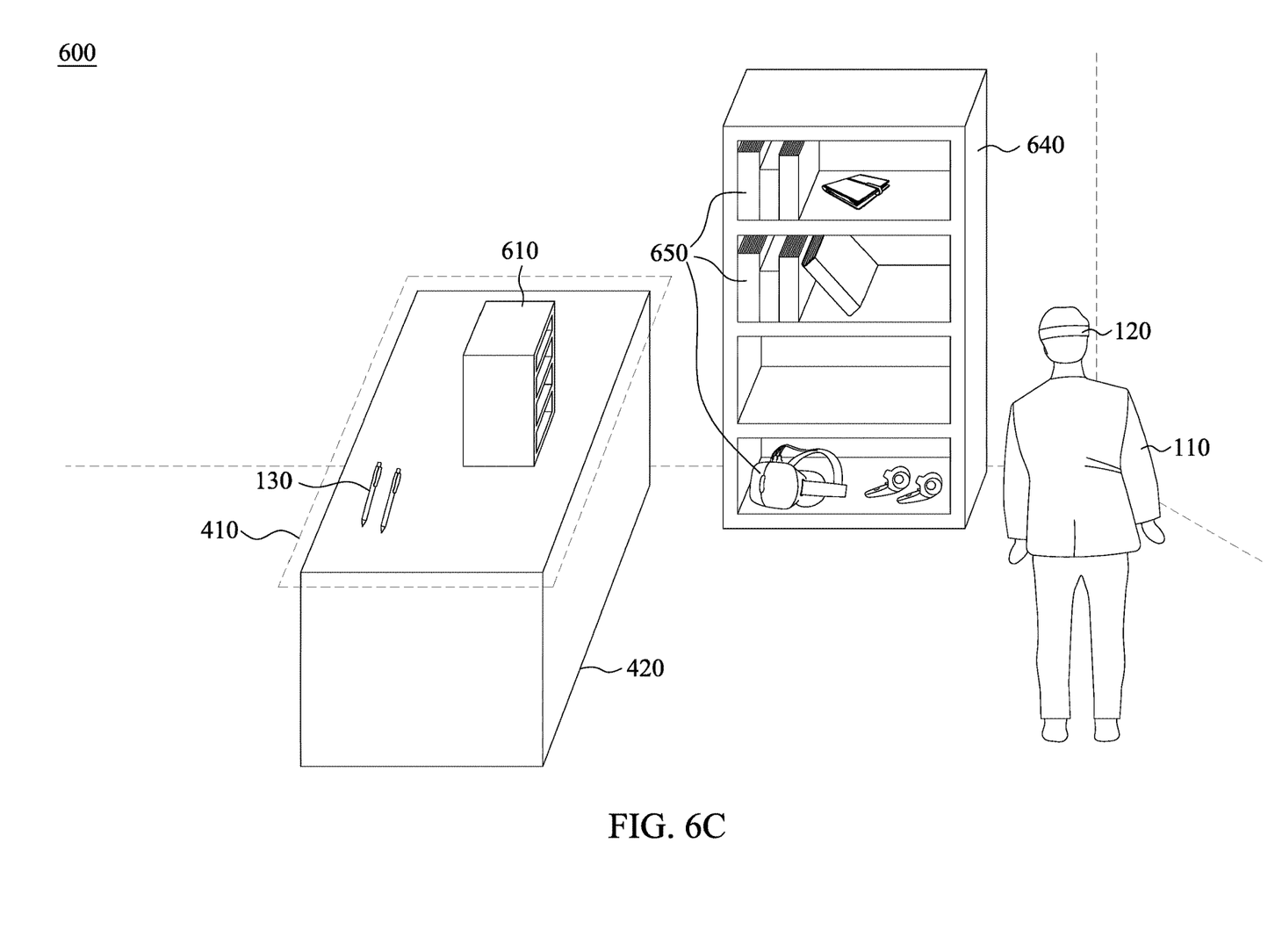
FIG. 6C shows an illustrative scenario that the user enlarges the size of the 3D virtual object.

Reference is made to FIGS. 6B and 6C. The control circuit 210 generates a 3D virtual bookshelf 640 (i.e., a virtual object) in operation S512 having an appearance rendered according to the image information 252. The control circuit 210 may provide, through the display device 230, the virtual bookshelf 640 in front of the user 110, and on the straightly-gaze direction Gz of the user 110 in some implementations. The virtual object generated in operation S512 is adjustable in size (width, length, and height), and is rotatable and position-variable in some embodiments. As shown in FIG. 6C, for example, the user 110 may enlarge the virtual bookshelf 640 to have a size equal to the final creation, and place the virtual bookshelf 640 at a location in the virtual environment 600 having suitable distance, so as to evaluate under the true size whether there are any room for improvements, or whether any design defect exists.

For example, the user 110 may load other virtual objects 650 from a pre-established database (not shown) into the virtual environment 600 such as virtual book models and virtual HMD models. Then, the user 110 may place these virtual objects 650 on the levels of the virtual bookshelf 640 to evaluate whether the space between the levels are suitable.

Figure 7:
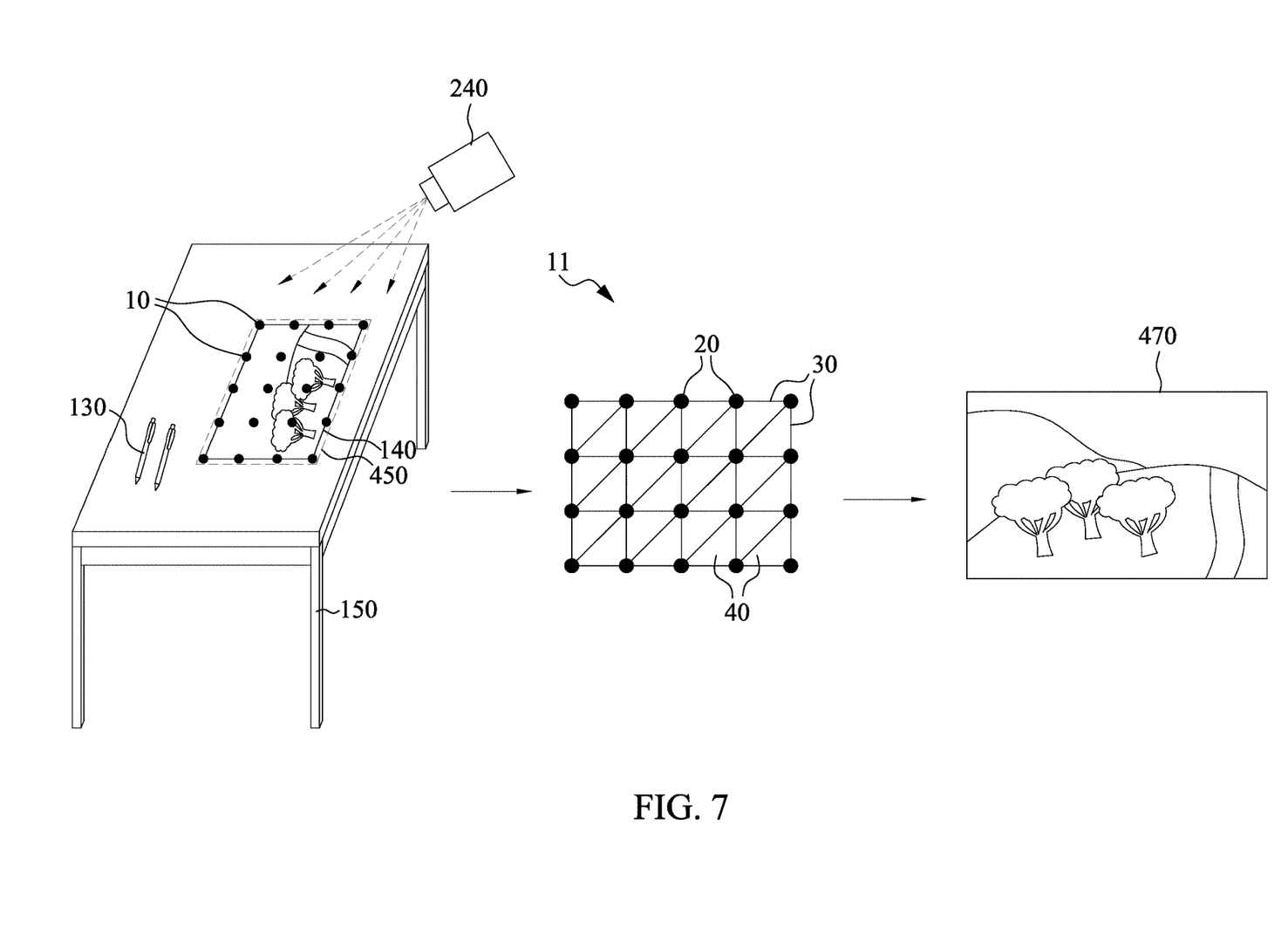
FIG. 7 shows the details of the generation of the 2D virtual object according to some embodiments of the present disclosure.

FIG. 7 is for explaining the details of the operation S312 of the method 300 (i.e., the details of the generation of the virtual mural 470) according to some embodiments of the present disclosure. A virtual object that is adjustable in size may be generated by rendering a "polygon mesh 11" as shown in FIG. 7 according to the image information 252. In some embodiments, the polygon mesh 11 is generated according to the depth information 254. Specifically, the control circuit 210 may first instruct the depth camera 240 to project a plurality of light dots 10 onto the selected plane 450 by using laser or infrared light. In the embodiment that the depth camera 240 is the TOF camera, the depth information 254 is generated by measuring a round trip time of light of each of the light dots 10.

Then, the control circuit 210 may generate a plurality of vertices 20 in which each vertex 20 has a corresponding 3D coordinate generated from the depth information 254. In this embodiment, the control circuit 210 determines that the sketch 140 (i.e., the real-world object) in the selected plane 450 is a 2D object based on the depth information 254, and thus the vertices 20 are located on the same plane. The control circuit 210 may determine how each vertex 20 is connected to other vertices 20 according to the shape of the sketch 140 (i.e., the real-world object) so as to determine the shape of the virtual object (e.g., the virtual mural 470) to be generated. An "edge 30" is formed when two vertices 20 are connected, and three edges 30 form a closed set called "face 40." Accordingly, the polygon mesh 11 is a collection of vertices 20, edges 30, and faces 40 that defines the shape of the virtual object. The virtual mural 470 is then generated by providing the polygon mesh 11 in the virtual environment 400, and also by rendering the polygon mesh 11 according to the image information 252 corresponding to the sketch 140.

Figure 8:
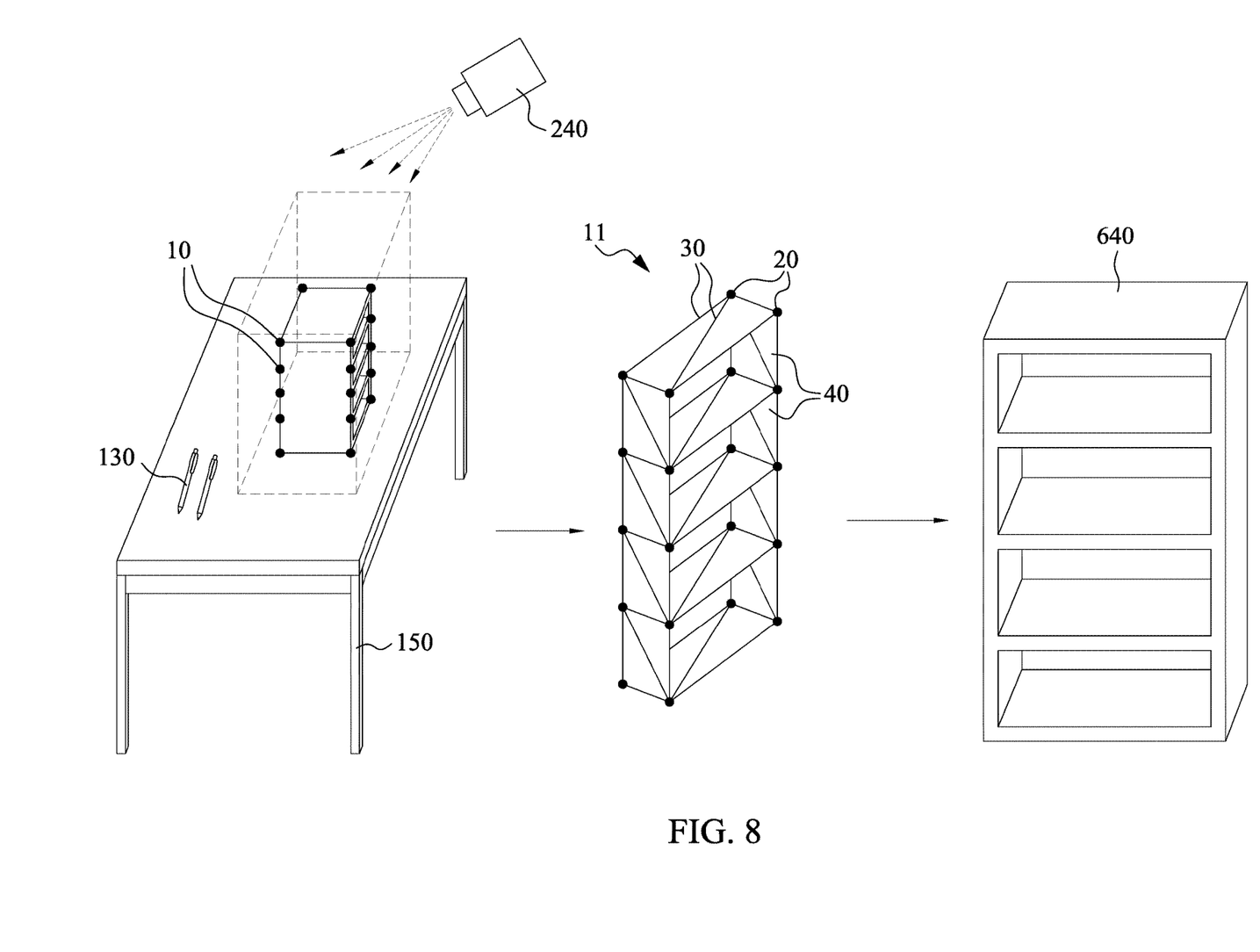
FIG. 8 shows the details of the generation of the 3D virtual object according to some embodiments of the present disclosure.

FIG. 8 is for explaining the details of the operation S512 of the method 500 (i.e., the details of the generation of the virtual bookshelf 640) according to some embodiments of the present disclosure. The control circuit 210 may obtain the depth information 254 through the depth camera 240 by projecting the light dots 10 onto the bookshelf model 610. In some embodiments, the depth information 254 may also be recorded in advance in operation S510 when the depth camera 240 is used to find the location of the bookshelf model 610. Similar to those processes discussed in reference of FIG. 7, a 3D polygon mesh 11 comprising the vertices 20, edges 30, and faces 40 may be generated according to the depth information 254 of the bookshelf model 610. Then, the virtual bookshelf 640 is generated by providing the polygon mesh 11 in the virtual environment 600, and also by rendering the polygon mesh 11 according to the image information 252 corresponding to the bookshelf model 610.

It should be understood that any other suitable types of depth camera 240 may be used in view of the teachings herein, and the HMD 120 may comprises multiple depth cameras having different perspectives in some embodiments to obtain the more detailed depth information 254 and the polygon mesh 11. The number of the light dots 10 and the vertices 20 of FIG. 7 and FIG. 8 is merely an example, rather than a restriction to practical implementations. In some embodiments, the number of the light dots 10 and the vertices 20 may be adjusted according to practical design requirements to improve the level of details of the polygon mesh 11. In some embodiments, each face 40 may be a closed set formed by four (4) edges 30, which is known as the "quad face."

As can be appreciated from the foregoing descriptions, the methods 300 and 500 help to accelerate the design schedule by finding out design defects and by improving the design concept in the very early stages. Moreover, the methods 300 and 500 facilitate image capturing through defining the selected plane 450 by the moving track 440 or 620, that is, the user 110 needs not to align the optical path of the optical camera 220 in direct with the real-world object to be captured. For example, the user 110 needs not to move the HMD 120 (his/her head) to be directly above the sketch 140 of FIG. 1 so as to capture the top view of the sketch 140. As another example, the user 110 needs not to crouch down to place the HMD 120 directly in front of the bookshelf model 610 so as the capture the front view of the bookshelf model 610.

The execution order of the operations in the previous flowcharts 300 or 500 is merely an example, rather than a restriction to practical implementations. In the flowchart 300 or 500, the operation 308 or 508 may be performed for multiple times to reduce or increase the area of the selected plane 450.

For example, after defining one selected plane, the user 110 may define another selected plane connected or partially overlapping with previous selected plane. The control circuit 210 would merge the two selected plane to define a new selected plane, or define the new selected plane as the previous selected plane subtracting the overlapping portion of the two selected planes.

In some embodiments, in response to that the control circuit 210 determines that the image information 252 contains texts, the HMD 120 may prompt the user whether to convert the texts into editable text file format which can be loaded into the virtual environments 400 or 600.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

In addition, the singular forms "a," "an," and "the" herein are intended to comprise the plural forms as well, unless the context clearly indicates otherwise.

Other embodiments of the present disclosure will be apparent to those skilled in the art from consideration of the specification and practice of the present disclosure disclosed herein. It is intended that the specification and examples be considered as exemplary only, with a true scope and spirit of the present disclosure being indicated by the following claims.

What is claimed is:

1. A method for capturing real-world information into a virtual environment, suitable for a head-mounted device (HMD) located in a physical environment, comprising:
    providing the virtual environment, wherein a real-world content within the virtual environment is captured from a part of the physical environment corresponding to a perspective of the HMD;
    tracking a feature point which located within the physical environment and moved by a user, so as to define a selected plane of the real-world content by projecting a moving track of the feature point onto the real-world content;
    capturing image information corresponding to the selected plane; and
    generating a virtual object having an appearance rendered according to the image information, wherein the virtual object is adjustable in size,
    wherein the HMD comprises an optical camera,
    the moving track comprises a x-axis vector, a y-axis vector and a z-axis vector having different directions, and
    the selected plane comprises a first side and a second side connected with each other, and a third side substantially perpendicular to the selected plane, wherein the first side, the second side and the third side are identified by projecting the x-axis vector, the y-axis vector and the z-axis vector onto the real-world content, respectively, according to a straight direction from a focal point of the optical camera to the feature point, wherein capturing the image information corresponding to the selected plane comprises:
    capturing at least part of an appearance of a real-world three-dimensional object, located in a selected space defined by the selected plane and the third side, as the image information,
    wherein the virtual object is three-dimensional.

2. The method of claim 1, wherein at least part of an edge of the selected plane is defined by projecting the moving track onto the real-world content according to the straight direction from the focal point of the optical camera to the feature point.

3. The method of claim 2, wherein the moving track comprises an enclosed area, the selected plane is defined by projecting the enclosed area onto the real-world content according to the straight direction from the focal point of the optical camera to the feature point, so that the selected plane and the enclosed area have shapes corresponding to each other.

4. The method of claim 1, wherein capturing the image information corresponding to the selected plane comprises:
recognizing a real-world three-dimensional object located in the selected plane by an image recognition algorithm or by a depth estimation algorithm; and
capturing at least part of an appearance of the real-world three-dimensional object as the image information,
wherein the virtual object is three-dimensional.

5. The method of claim 1, wherein generating the virtual object having the appearance rendered according to the image information comprises:
providing the virtual object substantially in front of the user; and
in response to the virtual object is two-dimensional, adjusting a surface of the virtual object to be perpendicular to a straightly-gaze direction of the user.

6. The method of claim 1, wherein the HMD comprises a depth camera, and generating the virtual object having the appearance rendered according to the image information comprises:
obtaining depth information of the selected plane through the depth camera;
generating a mesh according to the depth information; and
generating the virtual object by rendering the mesh according to the image information.

7. The method of claim 1, wherein the feature point is a finger of the user or an end of a handheld controller communicatively coupled with the HMD.

8. The method of claim 1, wherein the HMD comprises an optical camera, and the selected plane is defined by projecting the moving track onto the real-world content through a central projection method where a focal point of the optical camera is a center of projection.

9. A head-mounted device (HMD), located in a physical environment, comprising:
a display device;
an optical camera; and
a control circuit, being adapted to:
provide a virtual environment through the display device, wherein a real-world content within the virtual environment is captured from a part of the physical environment corresponding to a perspective of the HMD;
track, through the optical camera, a feature point which located within the physical environment and moved by a user, so as to define a selected plane of the real-world content by projecting a moving track of the feature point onto the real-world content;
capture, through the optical camera, image information corresponding to the selected plane; and
generate a virtual object having an appearance rendered according to the image information, wherein the virtual object is adjustable in size,
wherein the moving track comprises a x-axis vector, a y-axis vector and a z-axis vector having different directions, and
the selected plane comprises a first side and a second side connected with each other, and a third side substantially perpendicular to the selected plane, wherein the first side, the second side and the third side are identified by projecting the x-axis vector, the y-axis vector and the z-axis vector onto the real-world content, respectively, according to a straight direction from a focal point of the optical camera to the feature point, wherein capturing the image information corresponding to the selected plane comprises:
capturing at least part of an appearance of a real-world three-dimensional object, located in a selected space defined by the selected plane and the third side, as the image information,
wherein the virtual object is three-dimensional.

10. The HMD of claim 9, wherein at least part of an edge of the selected plane is defined by projecting the moving track onto the real-world content according to the straight direction from the focal point of the optical camera to the feature point.

11. The HMD of claim 10, wherein the moving track comprises an enclosed area, the selected plane is defined by projecting the enclosed area onto the real-world content according to the straight direction from the focal point of the optical camera to the feature point, so that the selected plane and the enclosed area have shapes corresponding to each other.

12. The HMD of claim 9, wherein when the control circuit captures, through the optical camera, the image information corresponding to the selected plane, the control circuit is further adapted to:
recognize a real-world three-dimensional object located in the selected plane by an image recognition algorithm or by a depth estimation algorithm; and
capture, through optical camera, at least part of an appearance of the real-world three-dimensional object as the image information,
wherein the virtual object is three-dimensional.

13. The HMD device of claim 9, wherein when the control circuit generates the virtual object having the appearance rendered according to the image information, the control circuit is further adapted to:
provide, through the display device, the virtual object substantially in front of the user; and
in response to the virtual object is two-dimensional, adjust a surface of the virtual object to be perpendicular to a straightly-gaze direction of the user.

14. The HMD of claim 9, further comprises a depth camera, wherein when the control circuit generates the virtual object having the appearance rendered according to the image information, the control circuit is further adapted to:
obtain depth information of the selected plane through the depth camera;
generate a mesh according to the depth information; and
generate the virtual object by rendering the mesh according to the image information.

15. The HMD of claim 9, wherein the feature point is a finger of the user or an end of a handheld controller communicatively coupled with the HMD.

16. The HMD of claim 9, wherein the selected plane is defined by projecting the moving track onto the real-world content through a central projection method where a focal point of the optical camera is a center of projection.

* * * * *